US009262524B2

United States Patent
Lv et al.

(10) Patent No.: US 9,262,524 B2
(45) Date of Patent: Feb. 16, 2016

(54) INFORMATION PRESENTATION METHOD, SYSTEM, CLIENT AND/OR SERVER

(71) Applicant: Tencent Technology (Shenzhen) Company Limited, Shenzhen (CN)

(72) Inventors: Yuanfang Lv, Shenzhen (CN); Sheng Cao, Shenzhen (CN); Wei Wu, Shenzhen (CN); Wei Liu, Shenzhen (CN); Ziming Wang, Shenzhen (CN); Jun Zhang, Shenzhen (CN); Qiong Wang, Shenzhen (CN); Huaheng Fan, Shenzhen (CN); Mengguang Lin, Shenzhen (CN); Yang Li, Shenzhen (CN); Yuxiang Fan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 207 days.

(21) Appl. No.: 14/094,919

(22) Filed: Dec. 3, 2013

(65) Prior Publication Data

US 2014/0095510 A1  Apr. 3, 2014

Related U.S. Application Data

(63) Continuation of application No. PCT/CN2013/079283, filed on Jul. 12, 2013.

(30) Foreign Application Priority Data

Jul. 17, 2012  (CN) .......................... 2012 1 0247420

(51) Int. Cl.
G06F 15/16 (2006.01)
G06F 17/30 (2006.01)
(Continued)

(52) U.S. Cl.
CPC ...... *G06F 17/30861* (2013.01); *G01C 21/3682* (2013.01); *G06F 3/048* (2013.01);
(Continued)

(58) Field of Classification Search
CPC . H04W 64/00; H04M 11/04; H04M 1/72572; H04M 2242/30; H04M 1/27455; Y02T 90/162

USPC .................. 709/203, 224, 217; 715/738, 764, 715/856–858
See application file for complete search history.

(56) References Cited

U.S. PATENT DOCUMENTS 5,802,492 A  9/1998  DeLorme et al.
8,954,860 B1 *  2/2015  Hands et al. .................. 715/738
(Continued)

FOREIGN PATENT DOCUMENTS

CN  101532843 A  9/2009
CN  101995259 A  3/2011
(Continued)

OTHER PUBLICATIONS

Patent Cooperation Treaty, The International Search Report and the Written Opinion of the International Searching Authority, mailed Oct. 17, 2013, in PCT/CN2013/079283.
(Continued)

*Primary Examiner* — Hitesh Patel
(74) *Attorney, Agent, or Firm* — Jones Day

(57) ABSTRACT

Systems and methods are provided for presenting information. For example, a trigger command is acquired; one or more first points of interest are selected based on at least information associated with the trigger command; a first zone associated with the first points of interest is acquired from an electronic map, the electronic map being divided into a plurality of second zones including the first zone; a predetermined number of third zones are acquired from the plurality of second zones, the first zone being included at a center area of the third zones; one or more first messages published in the third zones and one or more first geographic positions corresponding to the one or more first messages are acquired; and the first messages published in the third zones and the corresponding first geographic positions are presented according to certain embodiments.

23 Claims, 13 Drawing Sheets

(51) Int. Cl.
*G06F 3/048* (2013.01)
*H04L 12/58* (2006.01)
*G01C 21/36* (2006.01)
*H04W 4/02* (2009.01)
*H04W 4/12* (2009.01)
*H04W 4/20* (2009.01)
*H04L 29/08* (2006.01)

(52) U.S. Cl.
CPC ......... *G06F17/30598* (2013.01); *H04L 51/00* (2013.01); *H04L 51/20* (2013.01); *H04L 67/18* (2013.01); *H04W 4/02* (2013.01); *H04W 4/12* (2013.01); *H04W 4/206* (2013.01)

(56) References Cited

U.S. PATENT DOCUMENTS 9,134,135 B2 * 9/2015 Zhao et al.
2004/0198389 A1 * 10/2004 Alcock et al. .............. 455/456.1

FOREIGN PATENT DOCUMENTS

KR 1020040083338 10/2004
KR 1020100110290 10/2010

OTHER PUBLICATIONS

Korea Patent Office, Office Action issued Sep. 5, 2015, in Application No. 10-2014-7035443.

* cited by examiner

Figure 5

INFORMATION PRESENTATION METHOD, SYSTEM, CLIENT AND/OR SERVER

1. CROSS-REFERENCES TO RELATED APPLICATIONS

This application is a continuation of International Application No. PCT/CN2013/079283, with an international filing date of Jul. 12, 2013, now pending, which claims priority to Chinese Patent Application No. 201210247420.0, filed Jul. 17, 2012, both applications being incorporated by reference herein for all purposes.

2. BACKGROUND OF THE INVENTION

The present invention is directed to network technology. More particularly, the invention provides systems and methods for presenting information. Merely by way of example, the invention has been applied to client systems and server systems. But it would be recognized that the invention has a much broader range of applicability.

With the development of network technology, people become more and more willing to publish information related to personal observations and feelings through the internet to share with others. For example, microblogs or on-line communities provide platforms for publishing such information.

Microblog is a form of blogs that allows users to post messages publicly, update information timely, and permit everyone or a particular group to read the published messages. Microblog may be transmitted in many ways, including short-message-service (SMS) messages, instant communication software, entails, webpages, etc. Therefore, users may form individual communities through microblogs via the Web, Wireless Application Protocol (WAP) and various client systems so that the users can publish and update information to achieve instant information sharing.

An online community is often a virtual community on the internet. Members of an online community may gather for a certain common objective, and any member can publish information in the online community. For example, text contents may be published in an online chat room. In another example, audio files, video files and/or text contents may be published in an online forum.

But it is often difficult for a user to view information published at a certain geographic position through a microblog platform or an online community platform. Hence it is highly desirable to improve the techniques for presenting information.

3. BRIEF SUMMARY OF THE INVENTION

The present invention is directed to network technology. More particularly, the invention provides systems and methods for presenting information. Merely by way of example, the invention has been applied to client systems and server systems. But it would be recognized that the invention has a much broader range of applicability.

According to one embodiment, a processor-implemented method for presenting information includes, acquiring a trigger command, selecting, using one or more data processors, one or more first points of interest based on at least information associated with the trigger command, and acquiring, using the one or more data processors, a first zone associated with the first points of interest from an electronic map, the electronic map being divided into a plurality of second zones including the first zone. The method further includes, acquiring, using the one or more data processors, a predetermined number of third zones from the plurality of second zones, the first zone being included at a center area of the third zones, acquiring, using the one or more data processors, one or more first messages published in the third zones and one or more first geographic positions corresponding to the one or more first messages, and presenting the first messages published in the third zones and the corresponding first geographic positions.

According to another embodiment, a system for presenting information includes, a trigger module configured to acquire a trigger command, an extraction module configured to select one or more first points of interest based on at least information associated with the trigger command, and a zone-selection module configured to acquire a first zone associated with the first points of interest from an electronic map divided into a plurality of second zones including the first zone, and acquire a predetermined number of third zones from the plurality of second zones, the first zone being included at a center area of the third zones. The system further includes an acquisition module configured to acquire one or more first messages published in the third zones and one or more first geographic positions corresponding to the one or more first messages, and a presentation module configured to present the first messages published in the third zones and the corresponding first geographic positions.

According to yet another embodiment, a client system includes, a trigger module configured to acquire a trigger command, and a presentation module configured to present one or more messages published in a predetermined number of first zones associated with one or more points of interest and one or more first geographic positions corresponding to the messages, the points of interest being selected based on at least information associated with the trigger command.

In one embodiment, a server system includes, an extraction module configured to select one or more first points of interest based on at least information associated with a trigger command, a zone-selection module configured to acquire a first zone associated with the first points of interest from an electronic map divided into a plurality of second zones including the first zone, and acquire a predetermined number of third zones from the plurality of second zones, the first zone being included at a center area of the third zones, and an acquisition module configured to acquire one or more first messages published in the third zones and one or more first geographic positions corresponding to the one or more first messages and provide the first messages and the first geographic positions to a client system.

In another embodiment, a non-transitory computer readable medium comprising programming instructions for presenting information. The programming instructions are configured to cause one or more data processors to execute operations including, acquiring a trigger command, selecting one or more first points of interest based on at least information associated with the trigger command, and acquiring a first zone associated with the first points of interest from an electronic map, the electronic map being divided into a plurality of second zones including the first zone. The programming instructions are configured to cause one or more data processors to execute further operations including, acquiring a predetermined number of third zones from the plurality of second zones, the first zone being included at a center area of the third zones, acquiring one or more first messages published in the third zones and one or more first geographic positions corresponding to the one or more first messages, and presenting the first messages published in the third zones and the corresponding first geographic positions.

Depending upon embodiment, one or more benefits may be achieved. These benefits and various additional objects, features and advantages of the present invention can be fully appreciated with reference to the detailed description and accompanying drawings that follow.

For example, the systems and methods described herein can be configured to randomly select points of interest according to a trigger command, determine a target zone including the selected points of interest, select a predetermined number of zones including the target zone at the center, and obtain messages published in the predetermined number of zones and geographic positions corresponding to the published messages, so that users are enabled to browse conveniently and randomly information published at a certain geographic position and reduce the number of operations for information acquisition performed by a server system in order to improve the efficiency of network resources. As an example, the systems and methods described herein can be configured to obtain geographic positions of certain objects and display a target electronic map including such geographic positions so that users are enabled to conveniently view surrounding geographic information and determine routes to the geographic positions of the objects. As another example, the systems and methods described herein can be configured to scale up or down a target electronic map for users' convenience. In another example, the systems and methods described herein can be configured to dynamically adjust weights related to certain objects based on at least information associated with a number of points of interest related to the objects and quality of published messages related to the objects in order to improve quality of acquired messages so that the users are enabled to obtain useful information.

4. BRIEF DESCRIPTION OF THE DRAWINGS

FIG. 5 is a simplified diagram showing selection of certain zones on an electronic map according to one embodiment of the present invention;

5. DETAILED DESCRIPTION OF THE INVENTION

The present invention is directed to network technology. More particularly, the invention provides systems and methods for presenting information. Merely by way of example, the invention has been applied to client systems and server systems. But it would be recognized that the invention has a much broader range of applicability.

Figure 1:
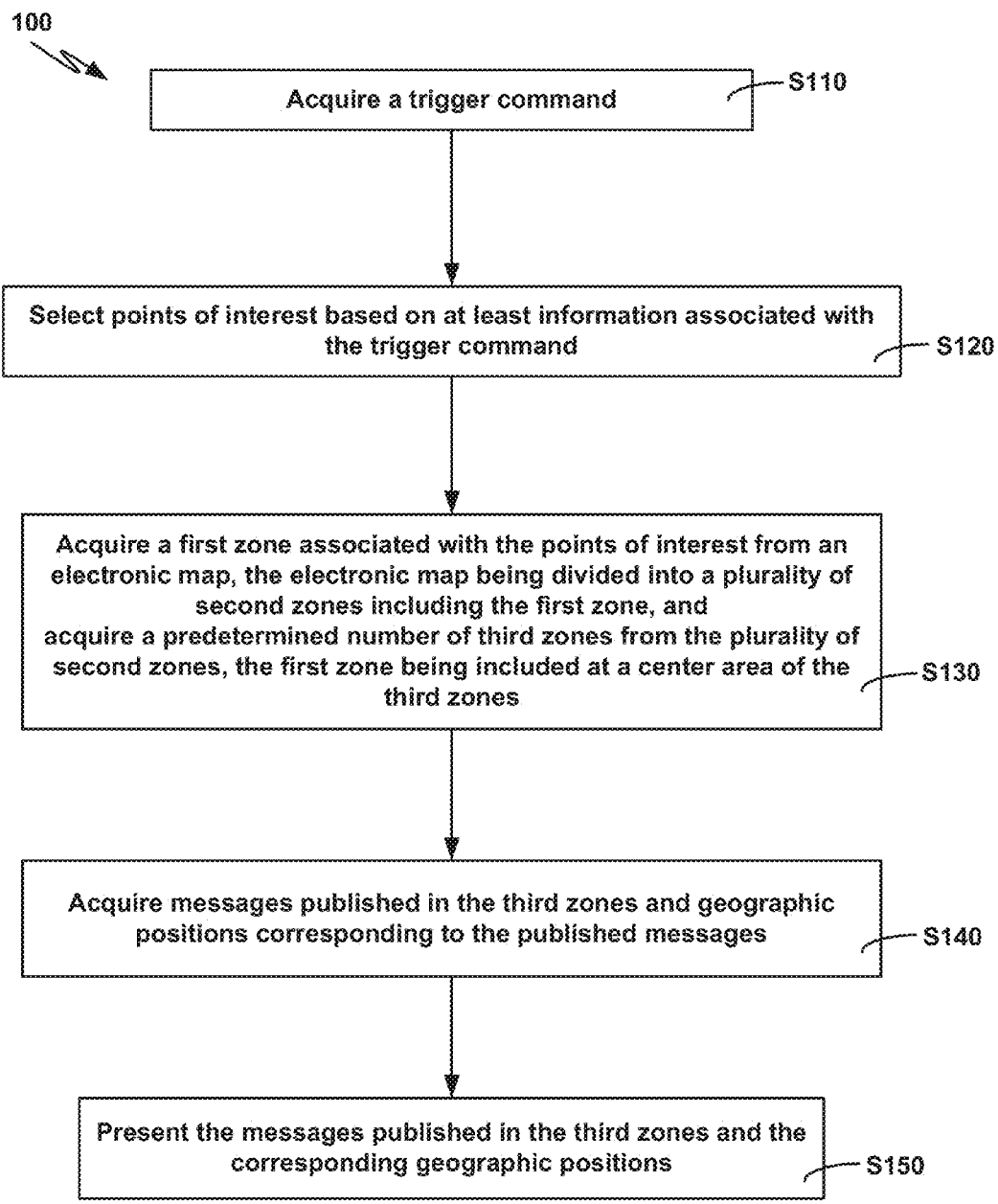
FIG. 1 is a simplified diagram showing a method for presenting information according to one embodiment of the present invention.

FIG. 1 is a simplified diagram showing a method for presenting information according to one embodiment of the present invention. This diagram is merely an example, which should not unduly limit the scope of the claims. One of ordinary skill in the art would recognize many variations, alternatives, and modifications. The method 100 for presenting information includes at least a process S110 for acquiring a trigger command, a process S120 for selecting points of interest based on at least information associated with the trigger command, and a process S130 for acquiring a first zone associated with the points of interest from an electronic map where the electronic map is divided into a plurality of second zones including the first zone, and acquiring a predetermined number of third zones from the second zones where the first zone is included at a center area of the third zones. In addition, the method 100 includes a process S140 for acquiring messages published in the third zones and geographic positions corresponding to the published messages, and a process S150 for presenting the messages published in the third zones and the corresponding geographic positions.

According to one embodiment, at the process S110, a trigger command is acquired, as shown in FIG. 1. For example, the trigger command is generated based on at least information associated with one or more audio signals collected at a client system (e.g., a mobile terminal, a tablet computer, a laptop, a desktop, or a server). As an example, the trigger command is generated based at least in part on a touch-control signal or a pressing signal related to the collected audio signals. In another example, after acquiring external audio signals at a trigger interface, the client system automatically switches to an information presentation interface. In addition, to retain accuracy of the trigger command, the collected audio signals are filtered to generate processed signals and the processed signals are then used for generating the trigger command, according to certain embodiments. For example, the client system acquires the trigger command and then provides the trigger command to a server system.

Figure 2:
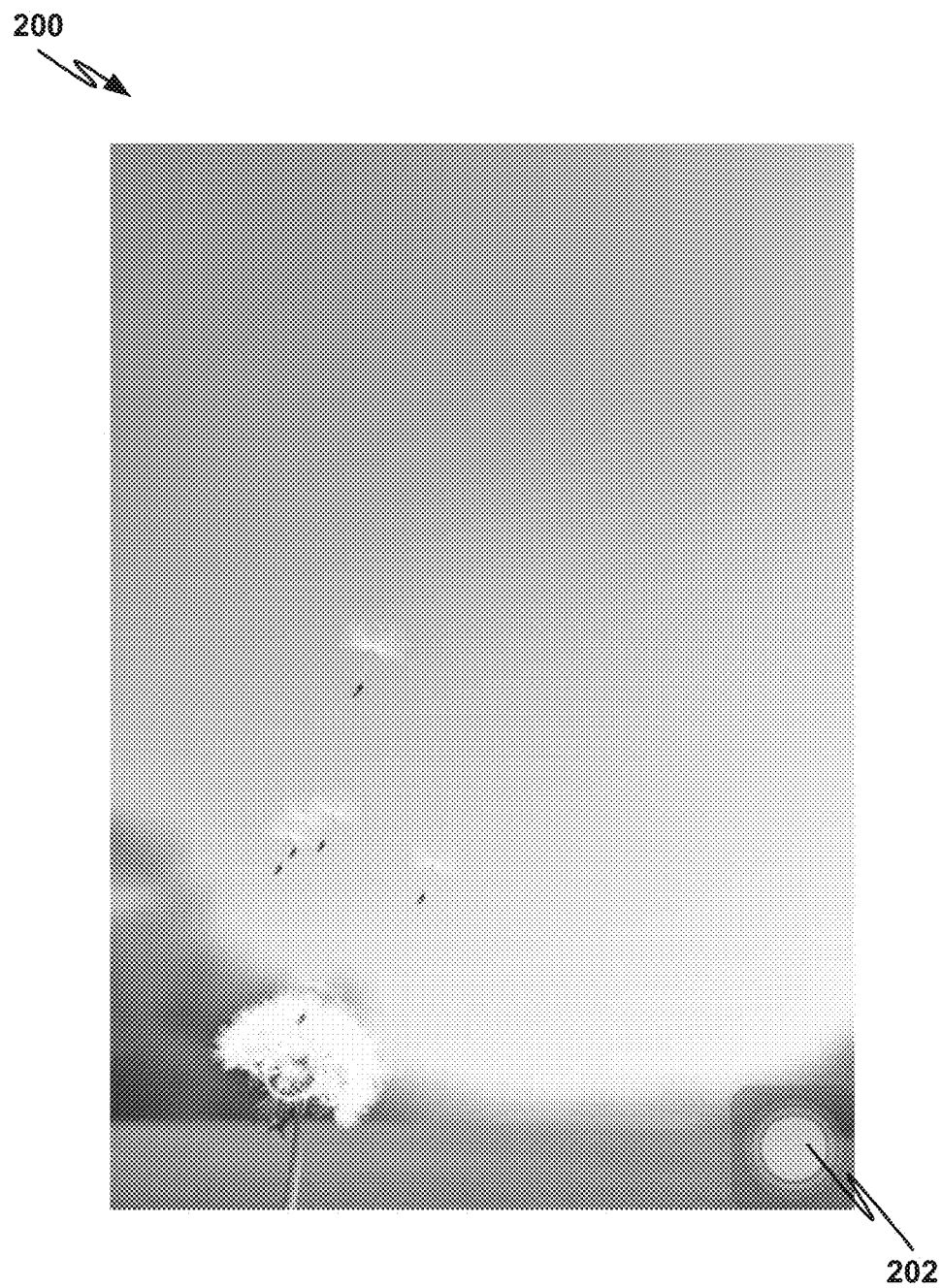
FIG. 2 is a simplified diagram showing a trigger interface according to one embodiment of the present invention.

FIG. 2 is a simplified diagram showing a trigger interface according to one embodiment of the present invention. This diagram is merely an example, which should not unduly limit the scope of the claims. One of ordinary skill in the art would recognize many variations, alternatives, and modifications. As shown in FIG. 2, the trigger interface 200 is provided with an audio signal inlet 202, according to certain embodiments. For example, if an external audio signal is collected through the audio signal inlet 202, the trigger interface is automatically switched to an information presentation interface 300, as shown in FIG. 3.

Figure 3:
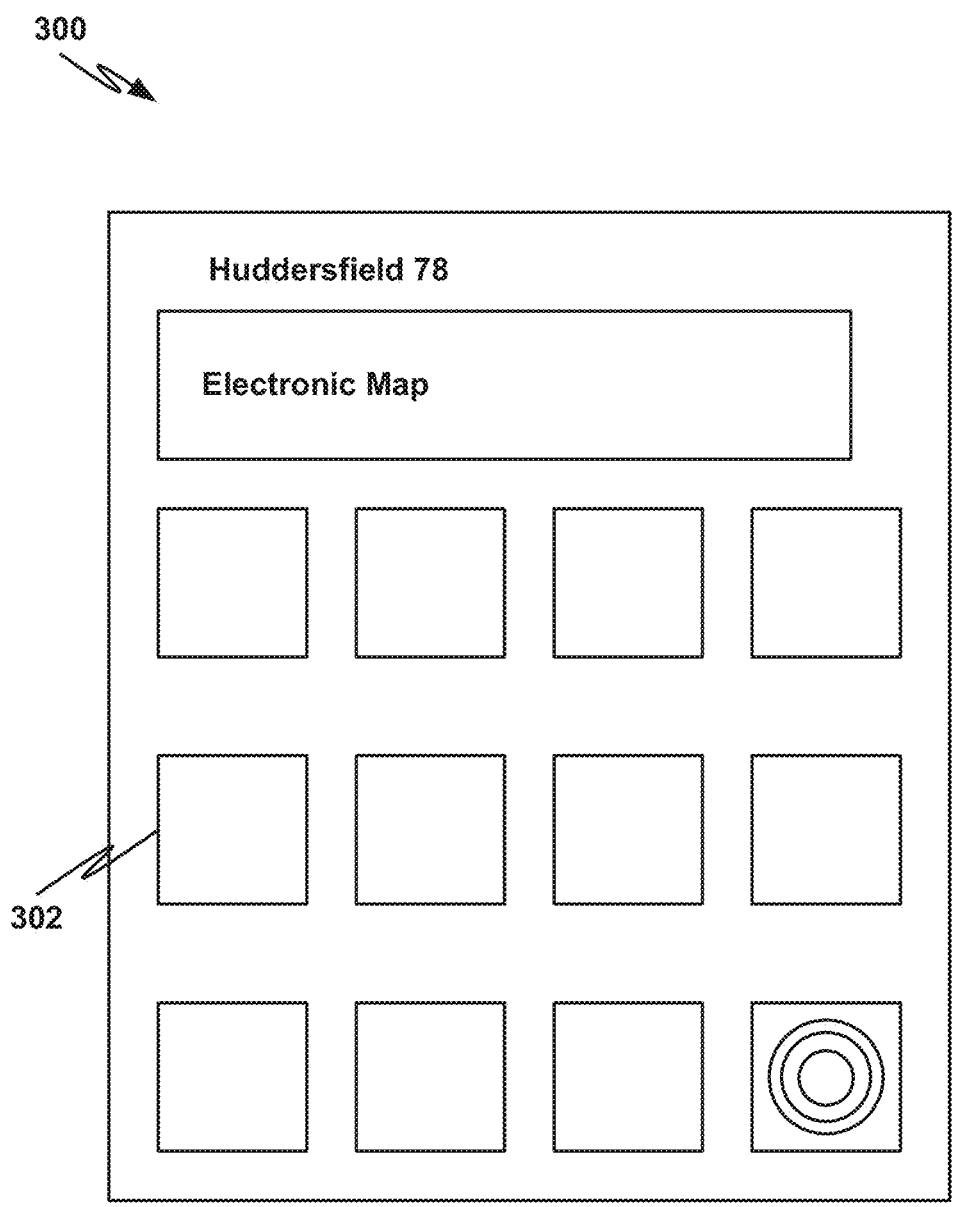
FIG. 3 is a simplified diagram showing information being presented on a presentation interface according to one embodiment of the present invention.

FIG. 3 is a simplified diagram showing an information presentation interface according to one embodiment of the present invention. This diagram is merely an example, which should not unduly limit the scope of the claims. One of ordinary skill in the art would recognize many variations, alternatives, and modifications. For example, an electronic map is presented on the information presentation interface 300.

Figure 4:
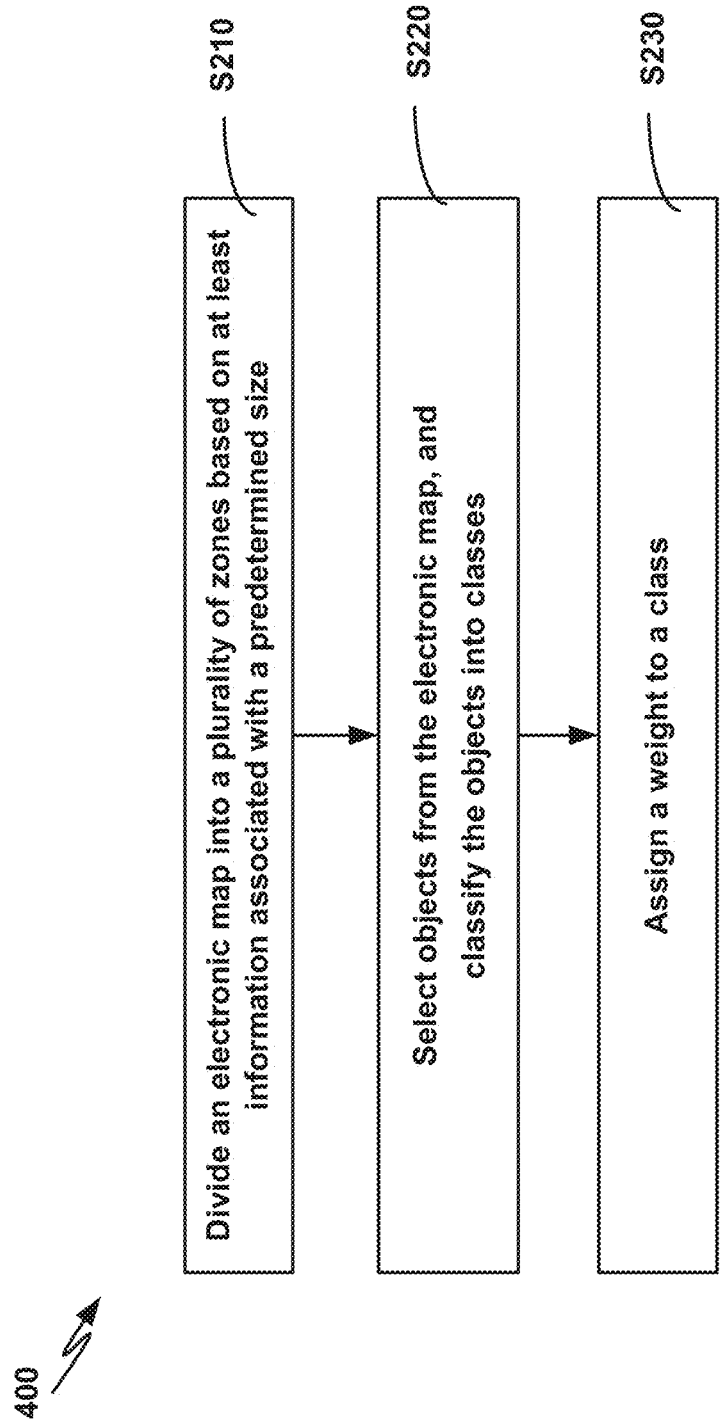
FIG. 4 is a simplified diagram showing a method for dividing an electronic map into zones and assigning weights to classes according to one embodiment of the present invention.

FIG. 4 is a simplified diagram showing a method for dividing an electronic map into zones and assigning weights to classes according to one embodiment of the present invention. This diagram is merely an example, which should not unduly limit the scope of the claims. One of ordinary skill in the art would recognize many variations, alternatives, and modifications. The method 400 includes at least a process S210 for dividing an electronic map into a plurality of zones based on at least information associated with a predetermined size, a process S220 for selecting one or more objects from the electronic map and classifying the objects into a number of classes, and a process S230 for assigning weights to the classes.

According to one embodiment, at the process S210, the electronic map is divided into a plurality of zones based on at least information associated with a predetermined size. The predetermined size may be set as needed. For example, the electronic map is divided into a plurality of zones by a same size of 1 km×1 km based at least in part on longitude coordinates and latitude coordinates. As an example, the electronic map is a world map or a map of a certain area in the world.

As shown in FIG. 4, at the process S220, one or more objects are selected from the electronic map and classified into a number of classes, according to some embodiments. Specially, the objects may refer to certain places on the electric map. For example, some scenic spots, restaurants or hotels can be selected as the objects. As an example, the selected scenic spots are divided into different classes, such as foreign scenic spots, domestic scenic spots, hometown, alma mater, random domestic places, or random foreign places. At the process 3230, weight may be assigned to one or more of the classes, according to certain embodiments.

In one embodiment, a class contains a number of objects and an object contains a number of points of interests (POIs). For example, a weight associated with a particular class may be set initially according to the number of POIs within the particular class. According to one embodiment, the more POIs there are in a class, the greater the weight of the class is. For example, a domestic-scenic-spot class may include an object, "Wuhan University." The object "Wuhan University" may include one or more PO's, such as the main entrance, Department of Arts and Sciences, and the hospital of the School of Engineering, etc. Different zones of the electronic map, the selected objects, the corresponding classes and the class weights are stored on a server system, according to certain embodiments.

Referring hack to FIG. 1, at the process S120, POIs are selected based on at least information associated with the trigger command, in some embodiments. Specifically, as an example, in response to the trigger command, the server system randomly selects one or more classes based on at least information associated with the class weights. Then, the server system randomly selects a number of objects classified into the selected classes based on at least information associated with an average probability, and randomly selects POIs from the selected objects based on at least information associated with an average probability, according to certain embodiments.

In one embodiment, a particular class is randomly selected based at least in part on the weight associated with such class. For example, an object within the class is randomly selected based at least in part on an average probability, and then a POI of the selected object is randomly selected based at least in part on an average probability. As an example, a domestic-scenic-spot class is randomly selected. Then, the object "Wuhan University" of the domestic-scenic-spot class is selected. If the object "Wuhan University" includes ten POIs belonging to different areas, the probability of a POI being selected is approximately 10%. As an example, POIs are stored in a. POI database.

As shown in FIG. 1, at the process S130, a first zone associated with certain POIs is acquired from the electronic map, where the electronic map is pre-divided into a plurality of second zones including the first zone, according to some embodiments. Then, a predetermined number of third zones may be acquired from the second zones, where the third zones include the first zone at a center area. As an example, after acquiring a POI, the server system searches in the different zones of the electronic map for a target zone that includes the POI. Then, the server system acquires a predetermined number of zones surrounding the target zone that includes the POI. For example, the predetermined zones surrounding the target zone are screened out based at least in part on their respective distance from the target zone. Specifically, as an example, the distances between the centers of different zones and the center of the target zone are calculated, and the predetermined number of zones may be selected based at least in part on the calculated distances (e.g., in an ascending order).

Figure 5:
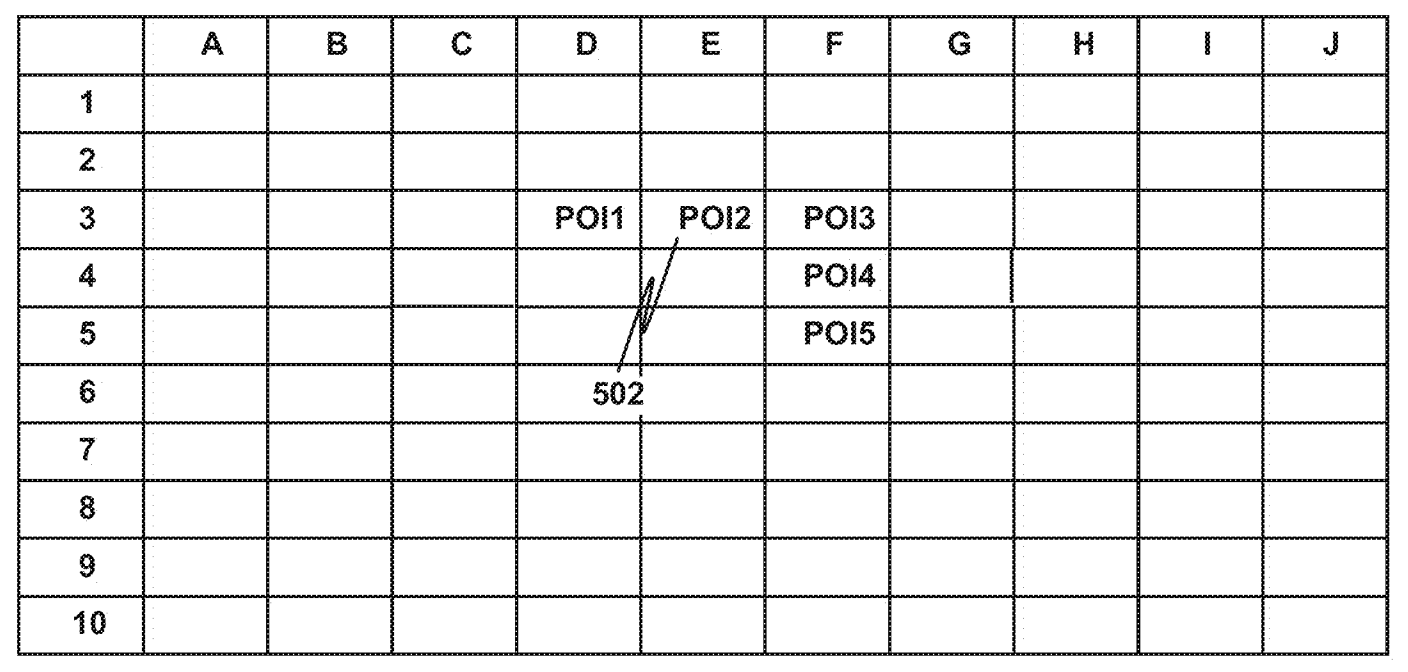

FIG. 5 is a simplified diagram showing selection of certain zones on an electronic map according to one embodiment of the present invention. This diagram is merely an example, which should not unduly limit the scope of the claims. One of ordinary skill in the art would recognize many variations, alternatives, and modifications. As shown in FIG. 5, the electronic map is divided into one hundred zones, according to one embodiment. These zones are between "A" and "J" horizontally and between "1" and "10" vertically, where each rectangular cell represents a zone. For example, a zone 502 that includes a particular POI (e.g., POI2) is acquired as a target zone. Twenty five zones that are in the vicinity of the target zone 502 are selected then where the target zone 502 is at the center area of the selected zones, according to some embodiments. As an example, these selected zones are between "C" and "G" horizontally and between "1" and "5" vertically.

Referring back to FIG. 1, the process S140 includes operations for acquiring one or more messages published in the third zones and one or more geographic positions corresponding to the one or more first messages, according to certain embodiments. For example, a message refers to a piece of information including textual contents, video contents, image contents, audio contents, and/or multi-media contents.

Specifically, as an example, the server system acquires the messages published in the predetermined number of third zones and the geographic positions corresponding to the published messages, and then provides the messages and the geographic positions to the client system. In one embodiment, the published messages contain information related to the geographic positions. For example, a publisher located at the Potala Palace posts a message "the Potala Palace is magnificent."

According to some embodiments, the process S150 includes presenting the messages published in the third zones and the geographic positions corresponding to the published messages, according to certain embodiments. For example, the published messages and the corresponding geographic positions are presented on the information presentation interface of the client system for a user to view such information. Referring to FIG. 3, the messages published in the third zones are presented on the information presentation interface, where a square box (e.g., 302) represents a zone, according to some embodiments. For example, if a return operation is triggered on the information presentation interface, the information presentation interface may switch to the trigger interface to acquire another trigger command for selecting a next POI.

A weight associated with a particular class is dynamically adjusted based on at least information associated with the number of POIs related to the class and the quality of the published messages related to the class, according to certain embodiments. For example, the quality of the published messages may be estimated based on certain conditions. As an example, a message is deemed to have a high quality if such message is accompanied with a picture of the geographic position where the message is published and a description of the geographic position.

In one embodiment, a method for estimating quality of a message includes one or more of the following operations: establishing in advance a keyword database including one or more first keywords corresponding to one or more first geographic positions and assigning weights to the first keywords; acquiring a message including information related to one or more second geographic positions and extracting one or more second keywords associated with the message; comparing the extracted second keywords with one or more third keywords stored in the keyword database where the third keywords correspond to the second geographic position and obtaining the weights associated with the second keywords; and summing up the weights of the second keywords to yield a weight of the message. For example, if the weight of the message is larger than a predetermined first threshold, it is determined that the message has a high quality; if the weight of the message is smaller than the first threshold, it is determined that the message has a low quality. As an example, if it is determined that the number of low-quality messages associated with a particular POI exceeds a predetermined second threshold, it is determined that the POI is inferior and may be deleted from the POI database.

Figure 6:
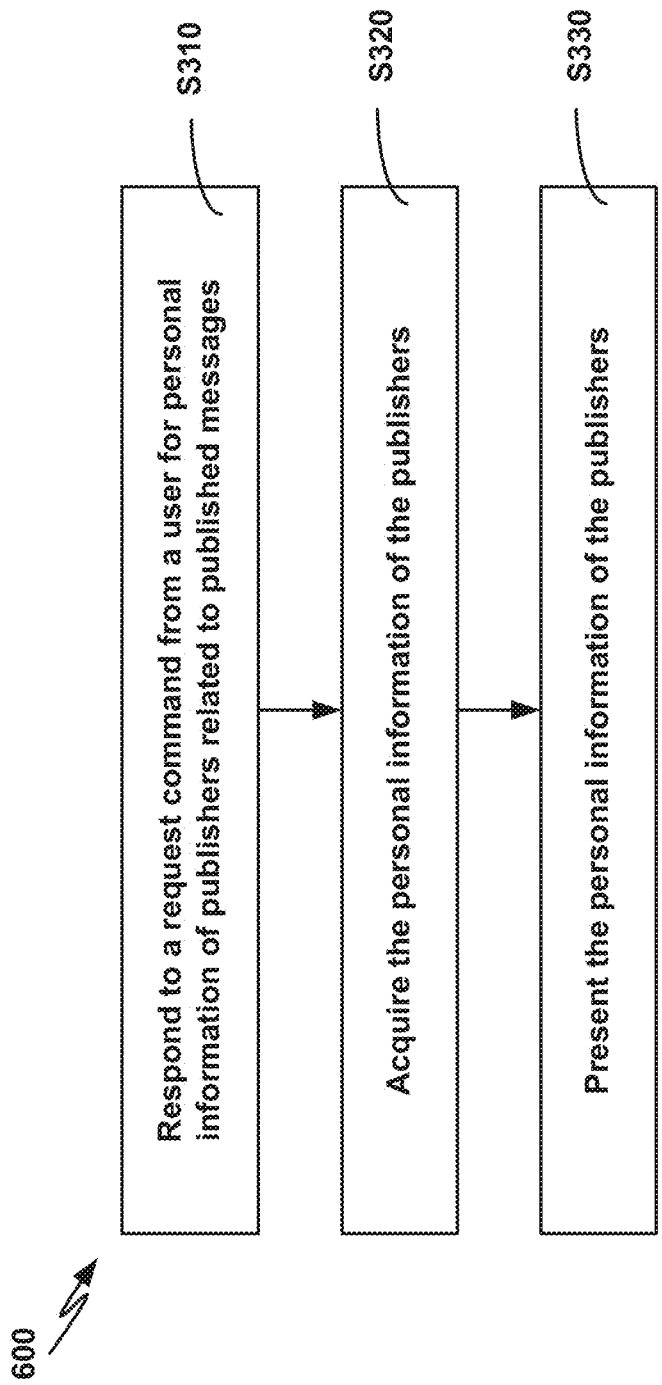
FIG. 6 is a simplified diagram showing a method for presenting certain information according to one embodiment of the present invention.

FIG. 6 is a simplified diagram showing a method for presenting certain information according to one embodiment of the present invention. This diagram is merely an example, which should not unduly limit the scope of the claims. One of ordinary skill in the art would recognize many variations, alternatives, and modifications. The method 600 includes at least a process S310 for responding to a request command from a user for personal information of one or more publishers related to certain published messages, a process S320 for acquiring the personal information of the publishers, and a process S330 for presenting the personal information of the publishers.

According to one embodiment, the process S310 includes responding to the request command from a user for the individual information of one or more specific publishers. For example, the client system acquires the request command from the user for the personal information of the publishers and the server system responds to the request command. As an example, at the process S320, the personal information of the publishers is acquired. In one embodiment, the personal information of a publisher includes a nickname, an individual signature information, a headshot, an album, etc. For example, the personal information of a microblog message poster may include a particular nickname, a headshot, an identification number, an individual signature, the number of audience, the number of followers, an album, etc.

According to another embodiment, at the process S330, the personal information of the publishers is presented. For example, the server system provides personal information of the publishers to the client system, and the information presentation interface of the client system presents such personal information of the publishers. As an example, if the information presentation interface can display a headshot, an interface associated with detailed personal information may be entered upon one or more clicks on the headshot.

Figure 7:
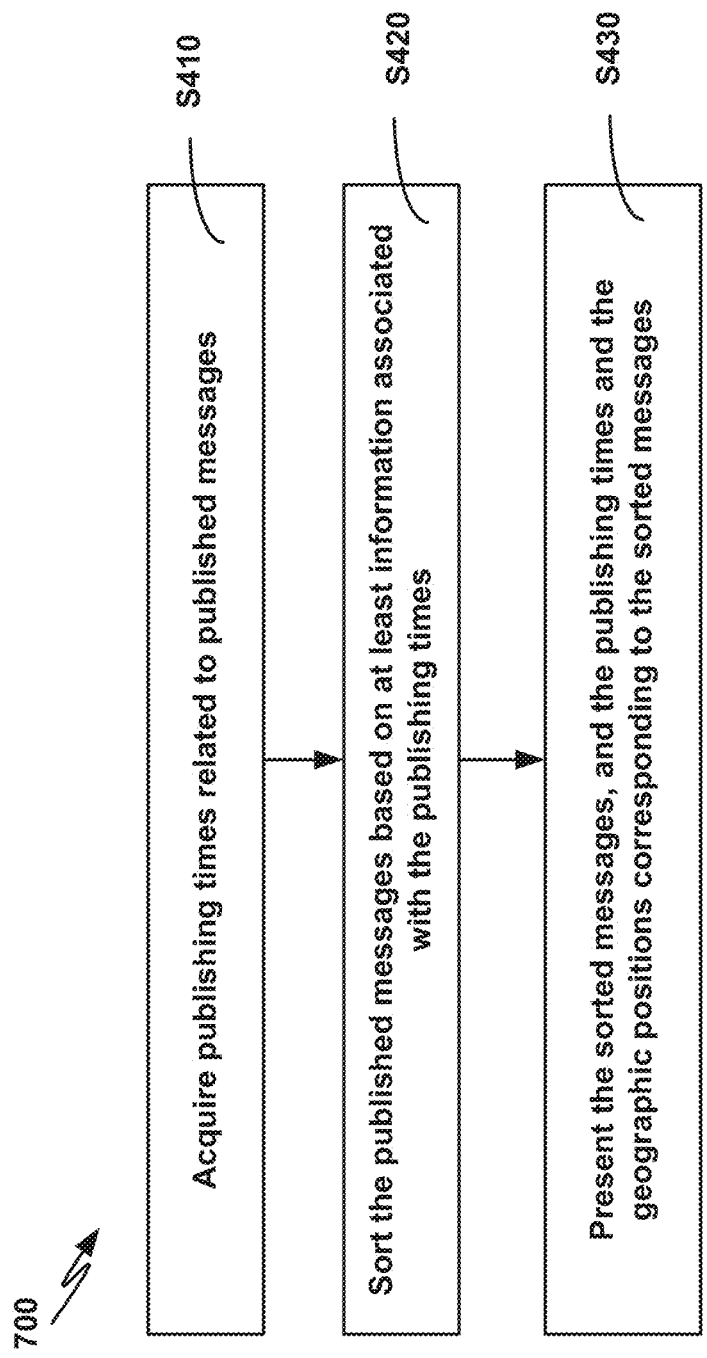
FIG. 7 is a simplified diagram showing a method for presenting certain information according to another embodiment of the present invention.

FIG. 7 is a simplified diagram showing a method for presenting certain information according to another embodiment of the present invention. This diagram is merely an example, which should not unduly limit the scope of the claims. One of ordinary skill in the art would recognize many variations, alternatives, and modifications. The method 700 includes at least a process S410 for acquiring one or more publishing times related to certain published messages, a process S420 for sorting the published messages based on at least information associated with the publishing times, and a process S430 for presenting the sorted messages, the publishing times and the first geographic positions corresponding to the sorted messages.

According to one embodiment, the process S410 includes acquiring one or more publishing times related to certain published messages. The publishing time of a message may be recorded when the message is published. For example, a message including "it rained today" is published from the Louvre Museum in Paris with a publishing time of June 27. In one embodiment, the server system acquires the publishing times of a number of messages, and sorts the messages based at least in part on the publishing times. For example, the server system provides to the client system the sorted messages, the publishing times and geographic positions corresponding to the sorted messages.

According to another embodiment, at the process S420, the published messages are sorted based at least in part on the publishing times. As an example, at the process 430, the sorted messages, the publishing times and geographic positions corresponding to the sorted messages are presented. In one embodiment, a message that is published later than the others may be presented first. For example, two messages are acquired, where one message is published on June 27, and the other on June 28. The message published on June 28 is presented first, and then the message published on June 27 is presented. In one embodiment, the number of messages to be presented may be determined based at least in part on the size of a terminal screen. For example, the messages that are not presented may be hidden, and can be presented upon a triggering operation.

Figure 8:
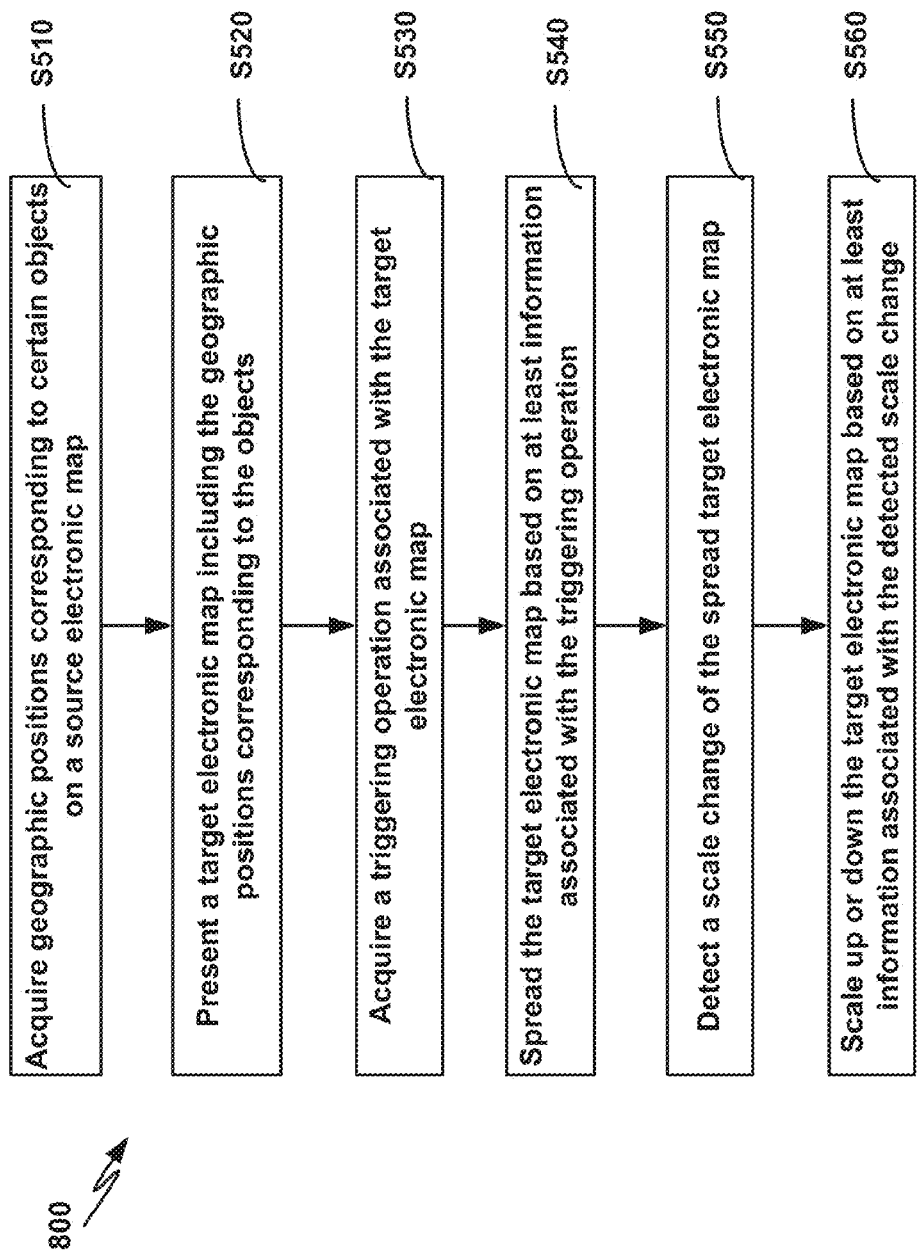
FIG. 8 is a simplified diagram showing a method for presenting certain information according to yet another embodiment of the present invention.

FIG. 8 is a simplified diagram showing a method for presenting certain information according to yet another embodiment of the present invention. This diagram is merely an example, which should not unduly limit the scope of the claims. One of ordinary skill in the art would recognize many variations, alternatives, and modifications. The method 800 includes at least a process S510 for acquiring one or more geographic positions corresponding to certain objects on a source electronic map, a process S520 for presenting a target electronic map including the geographic positions, and a process S530 for acquiring a triggering operation associated with the target electronic map. In addition, the method 800 includes a process S540 for spreading the target electronic map based on at least information associated with the triggering operation, a process S550 for detecting a scale change of the spread target electronic map, and a process S560 for scaling up or down the target electronic map based on at least information associated with the detected scale change.

According to one embodiment, at the process S510, one or more geographic positions corresponding to certain objects on a source electronic map are acquired. For example, after acquiring an object from the electronic map, the server system acquires the geographic position of the object on the electronic map and also a target electronic map including the geographic position of the object. Then the server system provides the target electronic map to the client system so that the target electronic map can be presented on the information presentation interface of the client system. In one embodiment, at the process S520, the target electronic map containing the geographic position of the object is presented. As an example, the target electronic map is an electronic map marking the geographic position of the object.

According to another embodiment, a triggering operation associated with the target electronic map is acquired at the process S530. For example, the triggering operation is acquired on the information presentation interface of the client system. As an example, the triggering operation may include touching, single clicking or double clicking the target electronic map. In some embodiments, the process S540 includes spreading the target electronic map in response to the triggering operation. Specifically, the target electronic map is spread on an interface of the client system, and information around an object on the target electronic map can be viewed, as an example.

According to yet another embodiment, the scale change of the spread target electronic map is detected at the process S550. For example, the scale change of the target electronic map is detected upon entering an interface associated with the target electronic map on the client system. As an example, a scale of an electronic map may refer to the ratio between the length unit of the electronic map and the length unit of an actual map, and the scale of the electronic map may be recorded by the client system. If the target electronic map is zoomed in or zoomed out, the scale of the target electronic map changes, in some embodiments. For example, a scale-up controller or a scale-down controller may be provided on the interface associated with the target electronic map, so that the target electronic map is scaled up by triggering the scale-up controller or scaled down by triggering the scale-down controller. In another example, the target electronic map may be scaled up or scaled down in response to a touching operation on the interface associated with the target electronic map. At the process S560, the target electronic map is scaled up or down based on at least information associated with the detected scale change, according to some embodiments. For example, if the scale of the target electronic map increases, the target electronic map is scaled up, and if the scale of the target electronic map decreases, the target electronic map is scaled down.

Figure 9:
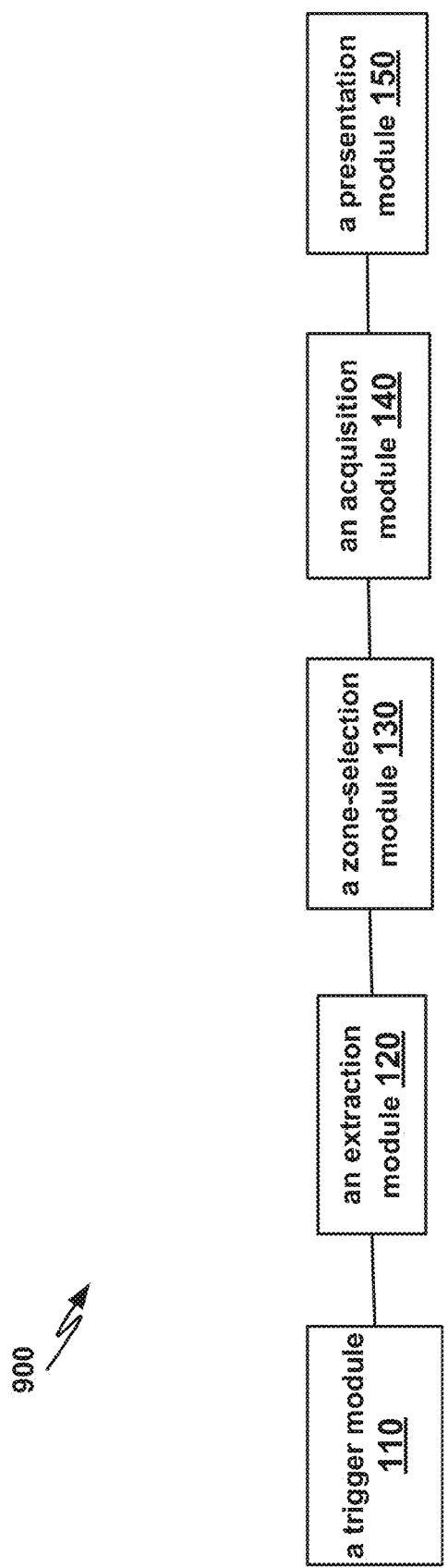
FIG. 9 is a simplified diagram showing certain components of an information presentation system according to one embodiment of the present invention.

FIG. 9 is a simplified diagram showing certain components of an information presentation system according to one embodiment of the present invention. This diagram is merely an example, which should not unduly limit the scope of the claims. One of ordinary skill in the art would recognize many variations, alternatives, and modifications. The information presentation system 900 includes a trigger module 110, an extraction module 120, a zone-selection module 130, an acquisition module 140 and a presentation module 150.

According to one embodiment, the trigger module 110 resides on a client system and is configured to acquire a trigger command. For example, the trigger command can be generated based on at least information associated with collected audio signals, touch-control signals or pressing signals. In one embodiment, the trigger command is generated based at least in part on collected audio signals. For example, when one or more audio signals are acquired through a trigger interface, an information presentation interface is automatically switched on. As an example, the collected audio signals may be filtered and then the trigger command is generated based at least in part on the filtered audio signals, so as to ensure the accuracy of the trigger command. The trigger module 110 may upload the acquired trigger command to a server system.

According to another embodiment, the extraction module 120 resides on the server system and is configured to select one or more POIs based on at least information associated with the trigger command. For example, the extraction module 120 randomly selects one or more classes based at least in part on the weights associated with the classes in response to the trigger command. As an example, the extraction module 120 randomly selects one or more objects from the selected classes based at least in part on an average probability and then randomly selects one or more POIs from the selected objects based at least in part on an average probability. An object may refer to a certain place selected on the electronic map. For example, some scenic spots, restaurants or hotels can be selected from an electronic world map as the objects. As an example, the selected scenic spots are divided into different classes, such as foreign scenic spots, domestic scenic spots, hometown, alma mater, random domestic places, or random foreign places. After a particular class is randomly selected based at least in part on the weight associated with the class, a certain object is randomly selected from the class based at least in part on an average probability, and then a POI of the object is randomly selected based at least in part on an average probability, according to certain embodiments. For example, a class of domestic scenic spots is selected, and then an object "Wuhan University" of the domestic-scenic-spot class is selected. If the object "Wuhan University" includes ten POIs belonging to different areas, the probability of a POI being selected is approximately 10%.

In one embodiment, the zone-selection module 130 resides on the server system and is configured to acquire a first zone associated with one or more POIs from an electronic map divided into a plurality of second zones including the first zone and acquire a predetermined number of third zones from the plurality of second zones, where third zones include the first zone at a center area. For example, the electronic map is divided in advance into a number of zones which are stored on the server system. As an example, after acquiring a POI, the zone-selection module 130 searches in the different zones of the electronic map for a target zone that includes the POI. Then, the server system acquires a predetermined number of zones where the target zone locates at the center area of the acquired zones. For example, the predetermined zones are screened out based at least in part on their respective distance from the target zone. Specifically, as an example, the distances between the centers of different zones and the center of the target zone are calculated, and the predetermined number of zones may be selected based at least in part on the calculated distances (e.g., in an ascending order). Referring to FIG. 5, the electronic map is divided into one hundred zones, according to one embodiment. These zones are between "A" and "J" horizontally and between "1" and "10" vertically, where each rectangular cell represents a zone. For example, the zone 502 that includes a particular POI (e.g., POI2) is acquired as a target zone. Twenty five zones that are in the vicinity of the target zone 502 are selected then where the target zone 502 is at the center area of the selected zones, according to some embodiments. As an example, these selected zones are between "C" and "G" horizontally and between "1" and "5" vertically.

In another embodiment, the acquisition module 140 resides on the server system configured to acquire one or more messages published in the third zones and one or more geographic positions corresponding to the messages. The published messages include information related to geographic positions corresponding to the messages, according to certain embodiments. For example, a publisher located at the Potala Palace posts a message "the Potala Palace is magnificent." In one embodiment, the presentation module 150 resides on the client system and is configured to present the messages published in the third zones and the corresponding geographic positions. For example, the presentation module 150 presents the messages and the corresponding geographic positions on the information presentation interface of the client system.

Figure 10:
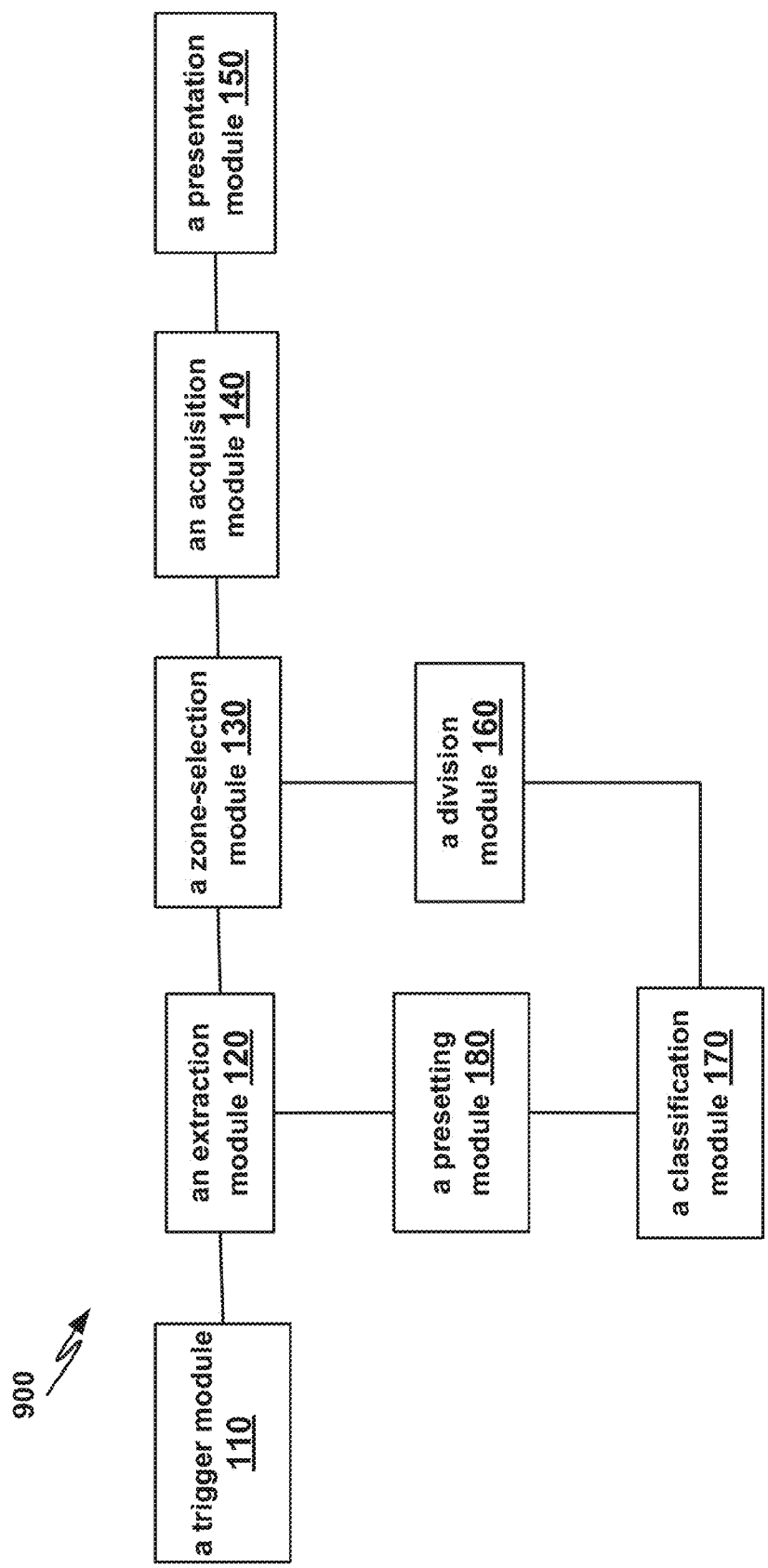
FIG. 10 is a simplified diagram showing certain components of an information presentation system according to another embodiment of the present invention.

FIG. 10 is a simplified diagram showing certain components of the information presentation system 900 according to another embodiment of the present invention. This diagram is merely an example, which should not unduly limit the scope of the claims. One of ordinary skill in the art would recognize many variations, alternatives, and modifications. The information presentation system 900 further includes a division module 160, a classification module 170 and a presetting module 180, in addition to the trigger module 110, the extraction module 120, the zone-selection module 130, the acquisition module 140 and the presentation module 150.

According to one embodiment, the division module 160 resides on the server system and is configured to divide the electronic map into the plurality of second zones based on at least information associated with a predetermined size, where the predetermined size can be set as needed. For example, the electronic map is divided into a plurality of zones by a same size of 1 km×1 km based at least in part on longitude coordinates and latitude coordinates. As an example, the electronic map is a world map or a map of a certain area in the world.

According to another embodiment, the classification module 170 resides on the server system and is configured to select one or more objects from the electronic map and classify the one or more objects into a number of classes. Specially, the objects refer to certain places on the electric map. For example, some scenic spots, restaurants or hotels can be selected as the objects. As an example, the selected scenic spots are divided into different classes, such as foreign scenic spots, domestic scenic spots, hometown, alma mater, random domestic places, or random foreign places.

According to yet another embodiment, the presetting module 180 resides on the server system and is configured to assign weights to one or more classes. As an example, a class contains a number of objects and an object contains a number of points of interests (POIs). For example, a weight associated with a particular class may be set initially according to the number of POIs within the particular class. In one embodiment, the more POIs there are in a class, the greater the weight of the class is. For example, a domestic-scenic-spot class may include an object, "Wuhan University." The object "Wuhan University" may include one or more POIs, such as the main entrance, Department of Arts and Sciences, and the hospital of the School of Engineering, etc.

Figure 11:
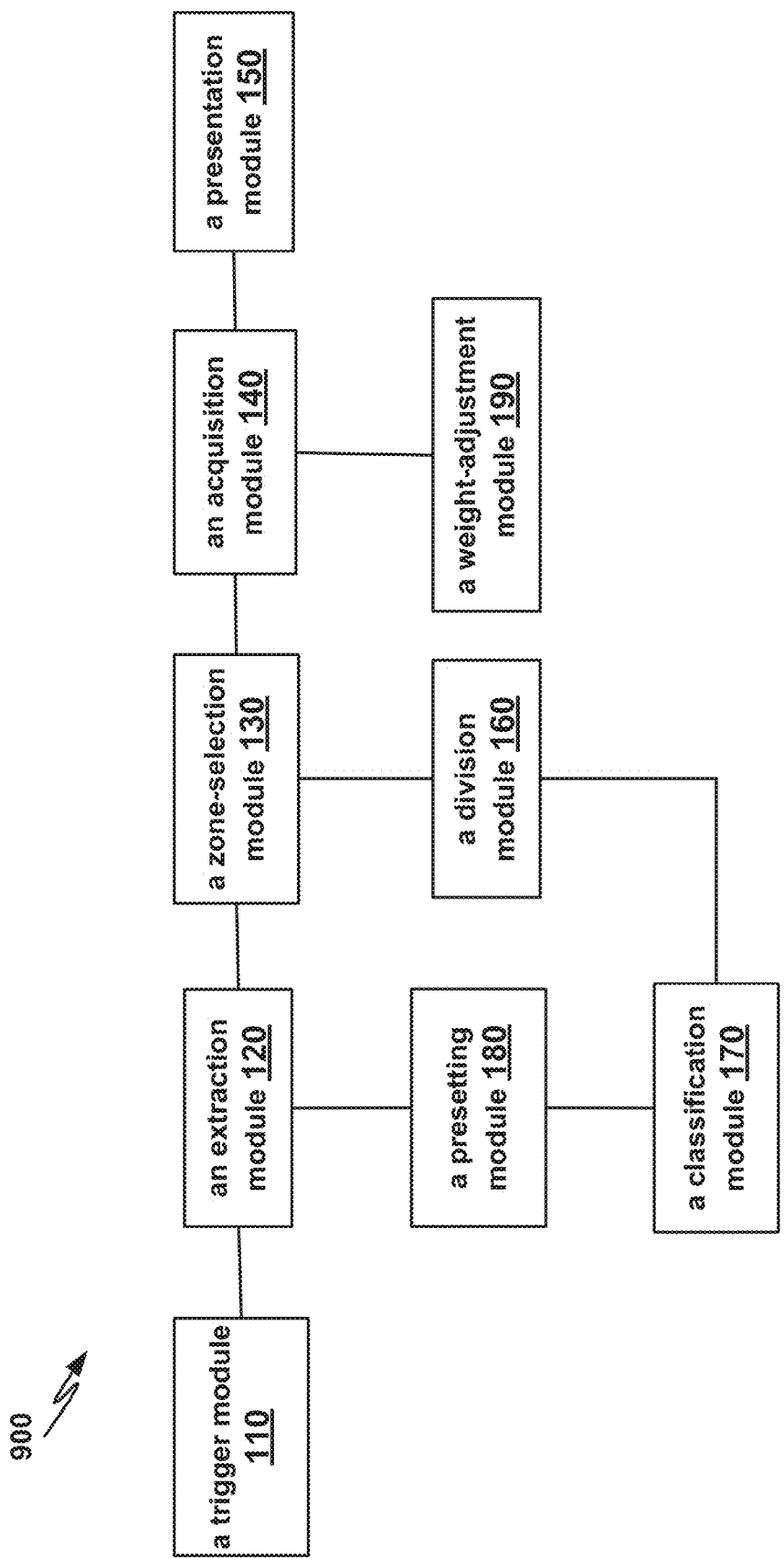
FIG. 11 is a simplified diagram showing certain components of an information presentation system according to yet another embodiment of the present invention.

FIG. 11 is a simplified diagram showing certain components of the information presentation system 900 according to another embodiment of the present invention. This diagram is merely an example, which should not unduly limit the scope of the claims. One of ordinary skill in the art would recognize many variations, alternatives, and modifications. The information presentation system 900 further includes a weight adjustment module 190, in addition to the trigger module 110, the extraction module 120, the zone-selection module 130, the acquisition module 140, the presentation module 150, the division module 160, the classification module 170 and the presetting module 180.

According to one embodiment, the weight adjustment module 190 is configured to adjust dynamically weights associated with objects based on at least information associated with the number of POIs related to the object and quality of published messages related to the object. For example, the quality of the published messages may be estimated based on certain conditions. As an example, a message deemed to have a high quality if such message is accompanied with a picture of the geographic position where the message is published and a description of the geographic position.

In some embodiments, the information presentation system 900 further includes a keyword database, a setting module, a comparison module, a summation module and a deletion module that reside on the server system. For example, the setting module is configured to assign weights to keywords corresponding to different geographic positions. As an example, the keyword database is configured to store the keywords corresponding to different geographic positions and the weights associated with the stored keywords. The acquisition module 140 is further configured to acquire one or more messages including information related to a geographic position and extract one or more keywords from the message; the comparison module is configured to compare the extracted keywords with the keywords stored in the keyword database corresponding to the geographic position and obtain one or more weights corresponding to the extracted keywords; and the summation module is configured to aggregate the weights of the extracted keywords to generate a weight of the message, according to certain embodiments. In one embodiment, the setting module is further configured to set a first threshold. For example, if the weight of message is larger than the first threshold, the message is determined to have a high quality, and if the weight of the message is smaller than the first threshold, the message is determined to have a low quality. In another example, the setting module is further configured to set a second threshold. For example, a POI associated with a plurality of messages is determined to be inferior, if the number of messages that have a low quality is larger than the second threshold. In another example, the deletion module is configured to delete the inferior POI from the POI database.

The acquisition module 140 is further configured to acquire personal information of certain publishers, according to certain embodiments. In one embodiment, the personal information of a publisher includes a nickname, an individual signature information, a headshot, an album, etc. For example, the personal information of a microblog message poster may include a particular nickname, a headshot, an identification number, an individual signature, the number of audience, the number of followers, an album, etc.

In one embodiment, the presentation module 150 is further configured to present personal information of one or more publishers. For example, the presentation module 150 on the client system acquires the personal information of a publisher, and presents such personal information on the information presentation interface. As an example, if the information presentation interface can display a headshot, an interface associated with detailed personal information may be entered upon one or more clicks on the headshot.

Figure 12:
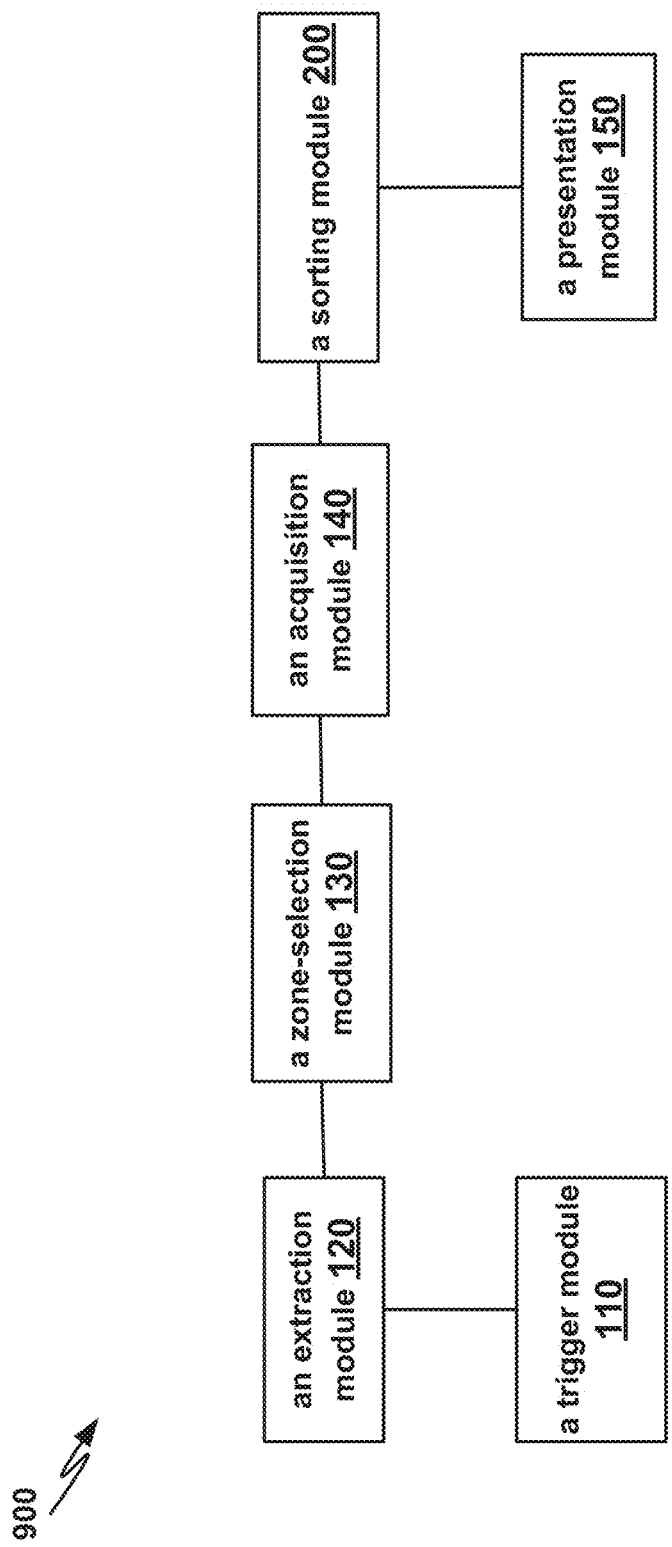
FIG. 12 is a simplified diagram showing certain components of an information presentation system according to yet another embodiment of the present invention.

FIG. 12 is a simplified diagram showing certain components of an information presentation system according to yet another embodiment of the present invention. This diagram is merely an example, which should not unduly limit the scope of the claims. One of ordinary skill in the art would recognize many variations, alternatives, and modifications. The information presentation system 900 further includes a sorting module 200, in addition to the trigger module 110, the extraction module 120, the zone-selection module 130, the acquisition module 140, and the presentation module 150.

According to one embodiment, the acquisition module 140 is configured to acquire one or more publishing times related to certain published messages. The publishing time of a message may be recorded when the message is published. For example, a message including "it rained today" is published from the Louvre Museum in Paris with a publishing time of June 27.

According to another embodiment, the sorting module 200 resides on the server system and is configured to sort a plurality of messages based at least in part on their respective publishing times. For example, the server system provides to the client system the sorted messages, the publishing times and geographic positions corresponding to the sorted messages.

According to some embodiments, the presentation module 150 is configured to the sorted messages, the publishing times and geographic positions corresponding to the sorted messages. In one embodiment, a message that is published later than the others may be presented first. For example, two messages are acquired, where one message is published on June 27, and the other on June 28. The message published on June 28 is presented first, and then the message published on June 27 is presented. In certain embodiments, the number of messages to be presented may be determined based at least in part on the size of a terminal screen. For example, the messages that are not presented may be hidden, and can be presented upon a triggering operation.

In some embodiments, the acquisition module 140 is further configured to acquire one or more geographic positions corresponding to certain objects on a source electronic map. For example, after acquiring an object from the electronic map, the acquisition module 140 acquires the geographic position of the object on the electronic map and also a target electronic map including the geographic position of the object to be presented on the information presentation interface. As an example, the presentation module 150 is further configured to present the target electronic map including the geographic position of the object.

Figure 13:
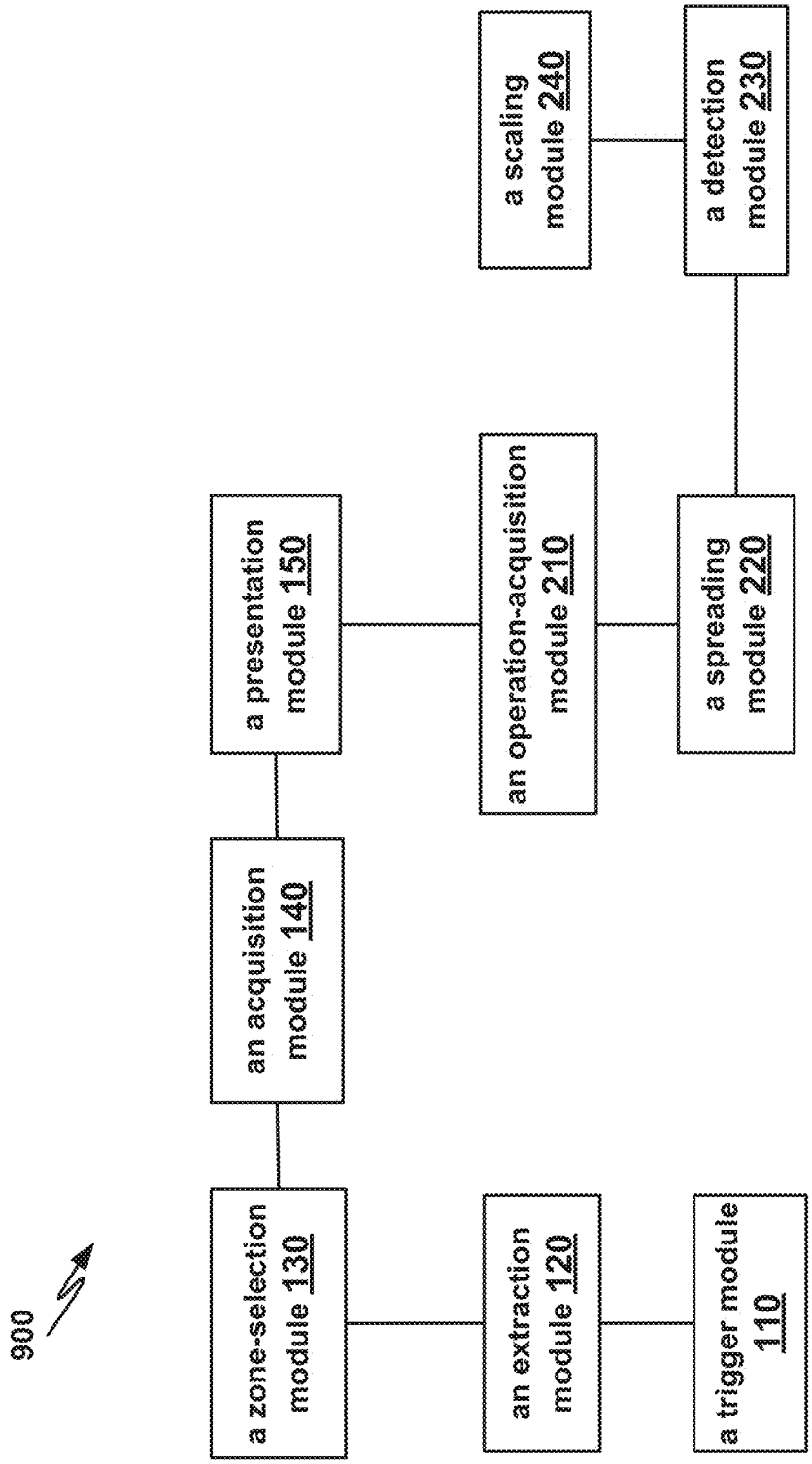
FIG. 13 is a simplified diagram showing certain components of an information presentation system according to yet another embodiment of the present invention.

FIG. 13 is a simplified diagram showing certain components of an information presentation system according to yet another embodiment of the present invention. This diagram is merely an example, which should not unduly limit the scope of the claims. One of ordinary skill in the art would recognize many variations, alternatives, and modifications. The information presentation system 900 further includes an operation-acquisition module 210, a spreading module 220, a detection module 230 and a scaling module 240, in addition to the trigger module 110, the extraction module 120, the zone-selection module 130, the acquisition module 140, and the presentation module 150.

According to one embodiment, the operation acquisition module 210 resides on the client system and is configured to acquire a triggering operation associated with a target electronic map. For example, the triggering operation associated with the target electronic map is acquired on the information presentation interface. As an example, the triggering operation may include touching, single clicking or double clicking the target electronic map.

According to another embodiment, the spreading module 220 resides on the client system and is configured to spread the target electronic map in response to the triggering operation. Specifically, the target electronic map is spread on an interface of the client system, and information around an object on the target electronic map can be viewed, as an example.

According to yet another embodiment, the detection module 230 is configured to detect a scale change of the target electronic map. For example, the scale change of the target electronic map is detected upon entering an interface associated with the target electronic map. As an example, a scale of an electronic map may refer to the ratio between the length unit of the electronic map and the length unit of an actual map, and the scale of the electronic map may be recorded by the client system. If the target electronic map is zoom in or zoom out, the scale of the target electronic map changes, in some embodiments. For example, a scale-up controller or a scale-down controller may be provided on the interface associated with the target electronic map. As an example, the detection module 230 detects a triggering operation upon the scale-up controller to scale up the target electronic map or detects a triggering operation upon the scale-down controller to scale down the target electronic map. In another example, the detection module 230 detects a touching operation on the interface associated with the target electronic map and, in response scale up or down the target electronic map.

In one embodiment, the scaling module 240 resides on the client system and is configured to scale up or down the target electronic map based on at least information associated with the detected scale change. For example, if the scale of the target electronic map increases, the scaling module 240 scales up the target electronic map, and if the scale of the target electronic map decreases, the scaling module 240 scales down the target electronic map.

According to some embodiments, a client system is provided, including the trigger module 110, and the presentation module 150. For example, the trigger module 110 is configured to acquire a trigger command and the presentation module 150 is configured to present one or more messages published in a predetermined number of zones associated with one or more POIs and one or more first geographic positions corresponding to the messages, where the POIs are selected based on at least information associated with the trigger command.

In one embodiment, the trigger module 110 is further configured to receive audio signals and generate the trigger command based on at least information associated with the audio signals. For example, the presentation module 150 is further configured to present a target electronic map including one or more second geographic positions corresponding to one or more objects selected from a source electronic map based on at least information associated with the trigger command.

In another embodiment, the client system also includes the operation-acquisition module 210, the spreading module 220, the detection module 230 and the scaling module 240. For example, the operation acquisition module 210 is configured to acquire a triggering operation associated with the target electronic map; the spreading module 220 is configured to spread the target electronic map based on at least information associated with the triggering operation; the detection module 230 is configured to detect a scale change of the spread target electronic map; and the scaling module 240 is configured to scale up or down the target electronic map based on at least information associated with the detected scale change. In another example, the presentation module 150 is further configured to present personal information of one or more publishers, messages sorted based on at least information associated with publishing times, the publishing times and geographic positions corresponding to the sorted messages.

According to some embodiments, the trigger module 110, the spreading module 150, the operation-acquisition module 210, the spreading module 220, the detection module 230 and the scaling module 240 of the client system perform same functions as the corresponding modules in the information presentation system 900.

According to certain embodiments, a server system is provided, including the extraction module 120, the zone-selection module 130, the acquisition module 140, the division module 160, the classification module 170, the presetting module 180, and the weight-adjustment module 190. These modules of the server system perform same functions as those corresponding modules in the information presentation system 900.

According to one embodiment, a processor-implemented method for presenting information includes, acquiring a trigger command, selecting, using one or more data processors, one or more first points of interest based on at least information associated with the trigger command, and acquiring, using the one or more data processors, a first zone associated with the first points of interest from an electronic map, the electronic map being divided into a plurality of second zones including the first zone. The method further includes, acquiring, using the one or more data processors, a predetermined number of third zones from the plurality of second zones, the first zone being included at a center area of the third zones, acquiring, using the one or more data processors, one or more first messages published in the third zones and one or more first geographic positions corresponding to the one or more first messages, and presenting the first messages published in the third zones and the corresponding first geographic positions. For example, the method is implemented according to at least FIG. 1, FIG. 4, FIG. 6, FIG. 7, FIG. 8, FIG. 9, FIG. 10, FIG. 11, FIG. 12, and/or FIG. 13.

According to another embodiment, a system for presenting information includes, a trigger module configured to acquire a trigger command, an extraction module configured to select one or more first points of interest based on at least information associated with the trigger command, and a zone-selection module configured to acquire a first zone associated with the first points of interest from an electronic map divided into a plurality of second zones including the first zone, and acquire a predetermined number of third zones from the plurality of second zones, the first zone being included at a center area of the third zones. The system further includes an acquisition module configured to acquire one or more first messages published in the third zones and one or more first geographic positions corresponding to the one or more first messages, and a presentation module configured to present the first messages published in the third zones and the corresponding first geographic positions. For example, the system is implemented according to at least FIG. 1, FIG. 4, FIG. 6, FIG. 7, FIG. 8, FIG. 9, FIG. 10, FIG. 11, FIG. 12, and/or FIG. 13.

According to yet another embodiment, a client system includes, a trigger module configured to acquire a trigger command, and a presentation module configured to present one or more messages published in a predetermined number of first zones associated with one or more points of interest and one or more first geographic positions corresponding to the messages, the points of interest being selected based on at least information associated with the trigger command. For example, the client system is implemented according to at least FIG. 1, FIG. 4, FIG. 6, FIG. 7, FIG. 8, FIG. 9, FIG. 10, FIG. 11, FIG. 12, and/or FIG. 13.

In one embodiment, a server system includes, an extraction module configured to select one or more first points of interest based on at least information associated with a trigger command, a zone-selection module configured to acquire a first zone associated with the first points of interest from an electronic map divided into a plurality of second zones including the first zone, and acquire a predetermined number of third zones from the plurality of second zones, the first zone being included at a center area of the third zones, and an acquisition module configured to acquire one or more first messages published in the third zones and one or more first geographic positions corresponding to the one or more first messages and provide the first messages and the first geographic positions to a client system. For example, the server system is implemented according to at least FIG. 1, FIG. 4, FIG. 6, FIG. 7, FIG. 8, FIG. 9, FIG. 10, FIG. 11, FIG. 12, and/or FIG. 13.

In another embodiment, a non-transitory computer readable storage medium comprising programming instructions for presenting information. The programming instructions are configured to cause one or more data processors to execute operations including, acquiring a trigger command, selecting one or more first points of interest based on at least information associated with the trigger command, and acquiring a first zone associated with the first points of interest from an electronic map, the electronic map being divided into a plurality of second zones including the first zone. The programming instructions are configured to cause one or more data processors to execute further operations including, acquiring a predetermined number of third zones from the plurality of second zones, the first zone being included at a center area of the third zones, acquiring one or more first messages published in the third zones and one or more first geographic positions corresponding to the one or more first messages, and presenting the first messages published in the third zones and the corresponding first geographic positions. For example, the storage medium is implemented according to at least the FIG. 1, FIG. 4, FIG. 6, FIG. 7, FIG. 8, FIG. 9, FIG. 10, FIG. 11, FIG. 12, and/or FIG. 13.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for presenting information, the processor-implemented method comprising:
   acquiring a trigger command;
   selecting, using one or more data processors, one or more first points of interest based on at least information associated with the trigger command;
   acquiring, using the one or more data processors, a first zone associated with the first points of interest from an electronic map, the electronic map being divided into a plurality of second zones including the first zone;
   acquiring, using the one or more data processors, a predetermined number of third zones from the plurality of second zones, the first zone being included at a center area of the third zones;
   acquiring, using the one or more data processors, one or more first messages published in the third zones and one or more first geographic positions corresponding to the one or more first messages;
   presenting the first messages published in the third zones and the corresponding first geographic positions;
   dividing the electronic map into the plurality of second zones based on at least information associated with a predetermined size;
   selecting one or more objects from the electronic map;
   classifying the one or more objects into a number of classes; and
   assigning weights to the classes;
   wherein the selecting one or more first points of interest based on at least information associated with the trigger command includes:
      in response to the trigger command, selecting randomly a first class based on at least information associated with a first weight assigned to the first class;
      selecting randomly one or more first objects classified into the first class based on at least information associated with a first average probability; and
      selecting randomly the first points of interest from the one or more first objects based on at least information associated with a second average probability.

2. The processor-implemented method of claim 1 wherein the acquiring a trigger command includes:
   receiving one or more audio signals; and
   generating the trigger command based on at least information associated with the one or more audio signals.

3. The processor-implemented method of claim 1, further comprising:
   adjusting dynamically the first weight based on at least information associated with a number of second points of interest related to the first class and quality of one or more second published messages related to the first class.

4. The processor-implemented method of claim 1, further comprising:
   acquiring one or more second geographic positions corresponding to the first objects on the electronic map; and
   presenting a target electronic map including the second geographic positions.

5. The processor-implemented method of claim 4, further comprising:
   acquiring a triggering operation associated with the target electronic map; and
   spreading the target electronic map based on at least information associated with the triggering operation.

6. The processor-implemented method of claim 5, further comprising:
    detecting a scale change of the spread target electronic map; and
    scaling up or down the target electronic map based on at least information associated with the detected scale change.

7. The processor-implemented method of claim 1, further comprising:
    responding to a request command from a user for personal information of one or more publishers related to the first messages;
    acquiring the personal information of the one or more publishers; and
    presenting the personal information of the one or more publishers.

8. The processor-implemented method of claim 1, further comprising:
    acquiring one or more publishing times related to the first messages;
    sorting the first messages based on at least information associated with the publishing times; and
    presenting the sorted first messages, the publishing times and the first geographic positions corresponding to the sorted first messages.

9. The processor-implemented method of claim 1, further comprising:
    establishing a keyword database including one or more first keywords corresponding to one or more second geographic positions;
    assigning first weights to the first keywords;
    acquiring a second message including information related to a third geographic position;
    extracting one or more second keywords associated with the second message;
    comparing the extracted second keywords with one or more third keywords in the keyword database, the third keywords corresponding to the third geographic position;
    obtaining one or more second weights associated with the one or more second keywords based on at least information associated with the comparison; and
    aggregating the second weights to generate a third weight associated with the second message.

10. The processor-implemented method of claim 9 wherein:
    if the third weight is larger than a predetermined first threshold, the second message is determined to have a high quality; and
    if the third weight is smaller than the first threshold, the second message is determined to have has a low quality.

11. The processor-implemented method of claim 10 wherein:
    a second point of interest is associated with a plurality of third messages, the plurality of third messages including one or more fourth messages having a low quality; and
    if a number of the fourth messages is larger than a predetermined second threshold, the second point of interest is determined to be inferior.

12. A system for presenting information, the system comprising:
    a processor; and
    a non-transitory computer readable storage medium storing programming instructions which, when executed by the processor, cause the processor to perform operations comprising:
        a trigger module configured to acquire a trigger command;
        an extraction module configured to select one or more first points of interest based on at least information associated with the trigger command;
        a zone-selection module configured to acquire a first zone associated with the first points of interest from an electronic map divided into a plurality of second zones including the first zone, and acquire a predetermined number of third zones from the plurality of second zones, the first zone being included at a center area of the third zones:
        an acquisition module configured to acquire one or more first messages published in the third zones and one or more first geographic positions corresponding to the one or more first messages;
        a presentation module configured to present the first messages published in the third zones and the corresponding first geographic positions;
        a division module configured to divide the electronic map into the plurality of second zones based on at least information associated with a predetermined size;
        a classification module configured to select one or more objects from the electronic map and classify the one or more objects into a number of classes; and
        a presetting module configured to assign weights to the classes;
        wherein the extraction module is further configured to:
            in response to the trigger command, select randomly a first class based on at least information associated with a first weight assigned to the first class;
            select randomly one or more first objects classified into the first class based on at least information associated with a first average probability; and
            select randomly the first points of interest from the one or more first objects based on at least information associated with a second average probability.

13. The system of claim 12 wherein the trigger module is further configured to receive one or more audio signals and generate the trigger command based on at least information associated with the audio signals.

14. The system of claim 12 wherein:
    the acquisition module is further configured to respond to a request command from a user for personal information of one or more publishers related to the first messages and acquire the personal information of the one or more publishers; and
    the presentation module is further configured to presenting the personal information of the one or more publishers.

15. The system of claim 12 wherein:
    the acquisition module is further configured to acquire one or more publishing times related to the first messages;
    the system further comprises a sorting module configured to sort the first messages based on at least information associated with the publishing times; and
    the presentation module is further configured to present the sorted first messages, and the publishing times and the first geographic positions corresponding to the sorted first messages.

16. The system of claim 12, further comprising:
    a weight-adjustment module configured to adjust dynamically the first weight based on at least information associated with a number of second points of interest related to the first class and quality of one or more second published messages related to the first class.

17. The system of claim 12 wherein:
the acquisition module is further configured to acquire one or more second geographic positions corresponding to the first objects on the electronic map; and
the presentation module is further configured to present a target electronic map including the second geographic positions.

18. The system of claim 17, further comprising:
an operation-acquisition module configured to acquire a triggering operation associated with the target electronic map; and
a spreading module configured to spread the target electronic map based on at least information associated with the triggering operation.

19. The system of claim 18, further comprising:
a detection module configured to detect a scale change of the spread target electronic map; and
a scaling module configured to scale up or down the target electronic map based on at least information associated with the detected scale change.

20. A server system comprising:
a processor; and
a non-transitory computer readable storage medium storing programming instructions which, when executed by the processor, cause the processor to perform operations comprising:
an extraction module configured to select one or more first points of interest based on at least information associated with a trigger command;
a zone-selection module configured to acquire a first zone associated with the first points of interest from an electronic map divided into a plurality of second zones including the first zone, and acquire a predetermined number of third zones from the plurality of second zones, the first zone being included at a center area of the third zones;
an acquisition module configured to acquire one or more first messages published in the third zones and one or more first geographic positions corresponding to the one or more first messages and provide the first messages and the first geographic positions to a client system;
a division module configured to divide the electronic map into the plurality of second zones based on at least information associated with a predetermined size;
a classification module configured to select one or more objects from the electronic map and classify the one or more objects into a number of classes; and
a presetting module configured to assign weights to the classes;
wherein the extraction module is further configured to:
in response to the trigger command, select randomly a first class based on at least information associated with a first weight assigned to the first class;
select randomly one or more first objects classified into the first class based on at least information associated with a first average probability; and
select randomly the first points of interest from the one or more first objects based on at least information associated with a second average probability.

21. The server system of claim 20, further comprising:
a weight-adjustment module configured to adjust dynamically the first weight based on at least information associated with a number of second points of interest related to the first class and quality of one or more second published messages related to the first class.

22. The server system of claim 20 wherein the acquisition module is further configured to:
acquire one or more second geographic positions corresponding to the first objects on the electronic map, personal information of one or more publishers related to the first messages, and one or more publishing times related to the first messages; and
provide the second geographic positions corresponding to the first objects on the electronic map, the personal information of the publishers related to the first messages, and the publishing times related to the first messages to a client system.

23. A non-transitory computer readable storage medium comprising programming instructions for presenting information, the programming instructions configured to cause one or more data processors to execute operations comprising:
acquiring a trigger command;
selecting one or more first points of interest based on at least information associated with the trigger command;
acquiring a first zone associated with the first points of interest from an electronic map, the electronic map being divided into a plurality of second zones including the first zone;
acquiring a predetermined number of third zones from the plurality of second zones, the first zone being included at a center area of the third zones;
acquiring one or more first messages published in the third zones and one or more first geographic positions corresponding to the one or more first messages;
presenting the first messages published in the third zones and the corresponding first geographic positions;
dividing the electronic map into the plurality of second zones based on at least information associated with a predetermined size;
selecting one or more objects from the electronic map;
classifying the one or more objects into a number of classes; and
assigning weights to the classes;
wherein the selecting one or more first points of interest based on at least information associated with the trigger command includes:
in response to the trigger command, selecting randomly a first class based on at least information associated with a first weight assigned to the first class;
selecting randomly one or more first objects classified into the first class based on at least information associated with a first average probability; and
selecting randomly the first points of interest from the one or more first objects based on at least information associated with a second average probability.

* * * * *